(12) United States Patent
Yamada

(10) Patent No.: US 6,393,225 B1
(45) Date of Patent: May 21, 2002

(54) CAMERA

(75) Inventor: Hiroyuki Yamada, Kofu (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/580,622

(22) Filed: May 30, 2000

(30) Foreign Application Priority Data

May 31, 1999 (JP) .......................................... 11-152869

(51) Int. Cl.⁷ .............................................. G03B 17/02
(52) U.S. Cl. ...................................... 396/535; 396/540
(58) Field of Search ................................ 396/541, 535, 396/448, 419, 420, 424, 421, 540, 661, 373, 376, 55, 29

(56) References Cited

U.S. PATENT DOCUMENTS

| | | | | |
|---|---|---|---|---|
| 4,875,065 A | * | 10/1989 | Kubodera et al. | 396/424 |
| 4,918,477 A | * | 4/1990 | Matsuda et al. | 396/540 |
| 5,177,517 A | * | 1/1993 | Schlapper et al. | 396/424 |
| 5,227,822 A | * | 7/1993 | Takahashi et al. | 396/424 |
| 5,563,674 A | * | 10/1996 | Von Holtz et al. | 396/540 |
| 5,708,897 A | * | 1/1998 | Manabe et al. | 396/535 |
| 6,014,522 A | * | 1/2000 | Reber, II | 396/29 |
| 6,073,902 A | * | 6/2000 | Hiles | 248/346.2 |

FOREIGN PATENT DOCUMENTS

| | | | | |
|---|---|---|---|---|
| JP | 09203840 | * | 5/1997 | G02B/7/02 |
| JP | 9-203840 | | 8/1997 | |

* cited by examiner

*Primary Examiner*—David M. Gray
(74) *Attorney, Agent, or Firm*—Frishauf, Holtz, Goodman, Langer & Chick, P.C.

(57) ABSTRACT

The present invention relates to a camera which gives, to the user, a suggestion of how the camera be hand-gripped readily and properly and can prevent camera shaking beforehand. The camera comprises a picture-taking lens for forming a subject image, a camera body section connected to the picture-taking lens, and an outer covering member covering the picture-taking lens and camera body section, in which, in the outer covering member, the bottom surface of a covered section corresponding to the camera body section and bottom surface of a covered section corresponding to the lower portion of the picture-taking lens are formed of a member of a higher friction coefficient than a remaining surface.

11 Claims, 2 Drawing Sheets

CAMERA

CROSS-REFERENCE TO RELATED APPLICATIONS

This application is based upon and claims the benefit of priority from the prior Japanese Patent Application No. 11-152869, filed May 31, 1999, the entire contents of which are incorporated herein by reference.

BACKGROUND OF THE INVENTION

The present invention relates to a camera having an outer covering member for preventing camera shaking prior to the time of taking a picture.

Conventionally, in an image pick-up apparatus such as a camera, various techniques have been developed to alleviate or prevent an adverse effect resulting from camera shaking when a picture is taken. Such camera shaking has a high possibility of occurring when the user holds the camera in an unstable state.

In particular, a beginner and tho se not familiar with the camera in a daily life do not have the slightest knowledge of how the camera should be hand-gripped. They often take pictures with a camera while holding the camera in an unstable manner. In such a state, camera shaking is produced.

In conventional cameras, a grip section, etc., is provided at a right-hand holding section of the camera so that, at an outer appearance, a proper design consideration is given to that holding section. As a result, the user has an understanding of how the camera should be gripped by the user's right hand.

In the above-mentioned conventional camera, the camera can be stably held by the right hand of the user due to the presence of the grip section on the camera. However, it is not possible for the user to grip the camera with the left hand, stably and properly. Since pictures are often taken while holding a camera with a user's left hand, camera shaking often occurs.

JPN PAT APPLN KOKAI PUBLICATION NO. 9-203840 discloses a technique of providing an annular covering member on a hand-holding section of a lens barrel which is used at a time of taking a picture with a camera hand-gripped. In this technique, the covering member is provided simply for the purpose of enhancing the operation of the lens barrel and, therefore, this structure never serves the purpose to hold the whole camera in a proper and stable way. Therefore, there is no description in this PUBLICATION which gives due consideration to camera shaking.

BRIEF SUMMARY OF THE INVENTION

The present invention has been achieved with the above in view and the object of the present invention provides a camera which has a structure of giving, to the user, a suggestion of how the camera be hand-gripped properly and stably and can beforehand prevent any adverse effect resulting from camera shaking.

In order to achieve the above-mentioned object of the present invention, there is provided a camera comprising a picture-taking optical system for forming a subject image, a camera body section connected to the picture-taking optical system and an outer covering member for covering the picture-taking optical system and camera body section, wherein a higher friction coefficient surface is provided at at least a bottom surface of a covered portion corresponding to the camera body section and at at least a covered portion corresponding to a lower portion of the picture-taking optical system than a remaining covered area.

Further, according to the present invention, there is provided a camera comprising a picture-taking optical system for forming a subject image, a camera body section connected to the picture-taking optical system, and an outer covering member for covering the picture-taking optical system and camera body section, wherein at least a portion of the outer covering member from the picture-taking optical system to a lower portion of the camera body section is covered with a rubber member.

Further, according to the present invention, there is provided a camera comprising a picture-taking optical system for forming a subject image, a camera body section connected to the picture-taking optical system, an outer covering member for covering the picture-taking optical system and camera body section, and a grip section situated at a lower portion of the outer covering member extending from the picture-taking optical system to the camera body section and having a higher coefficient of friction than the remaining surface of the outer covering member.

Further, according to the present invention, there is provided a camera comprising an outer covering member for covering a whole of the camera and a grip section whose grip position is eye-recognizable on the surface of the outer covering member and can be readily and properly gripped by the left hand of the user.

Further, according to the present invention, there is provided a camera comprising an outer covering member for covering a whole of a camera, and a grip portion formed continuous with at least a portion of those lower portions of a camera's barrel frame and body section wherein the grip position of the grip section is recognizable by hand touching and can be readily and properly gripped by the left hand of the user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained below with reference to the accompanying drawing.

Figure 1A:
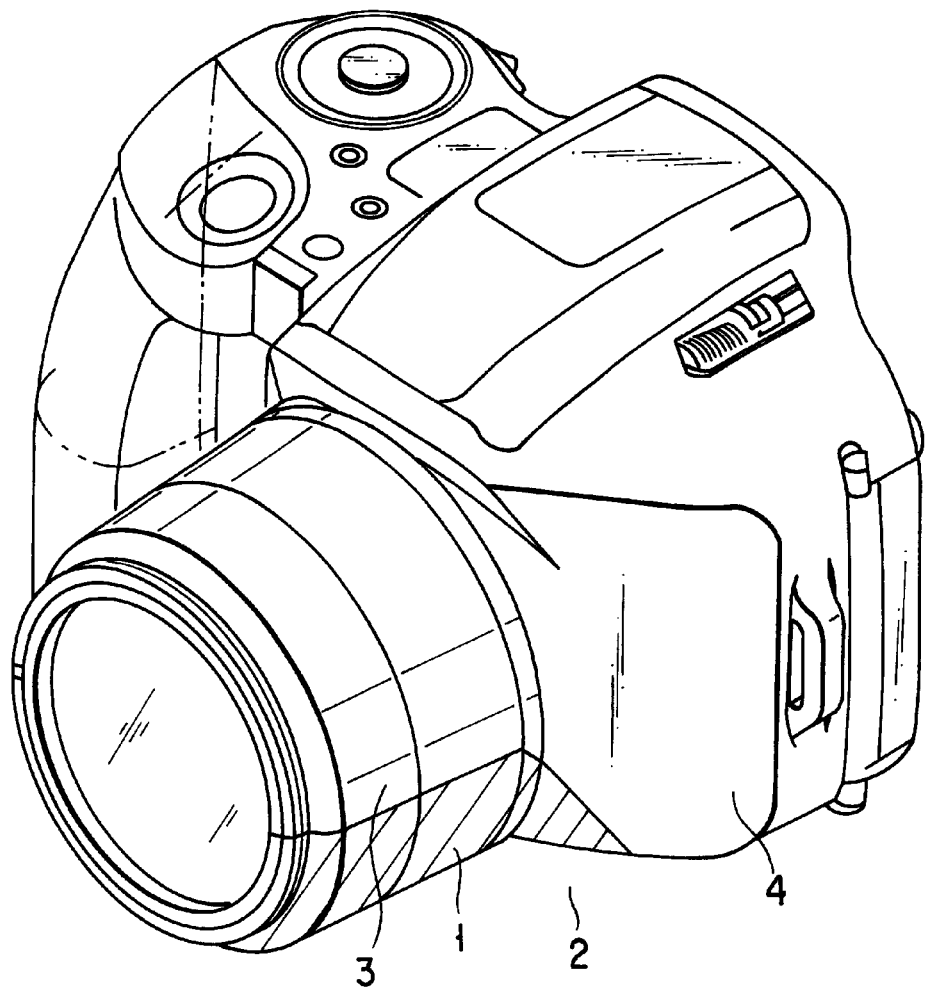
FIG. 1A is a perspective view showing a camera according to a first embodiment of the present invention.

FIG. 1A is a perspective view showing a camera according to an embodiment of the present invention. As shown in FIG. 1A, a camera body section 4 and lens barrel section 3 are assembled by an outer covering member 2 into an integral unit. A rubber member 1 is further provided at a predetermined area on a lower section of the member 2 extending from a lens barrel section 3 to the camera body section 4.

Figure 1B:
FIG. 1B is a view showing a cross-sectional shape of a rubber member.

As shown in FIG. 1B, the rubber member 1 has a rugged or uneven surface as shown in a cross-sectional view, so that it provides a ready hand-gripping area.

It is to be noted that the cross-sectional shape of the rubber member 1 is not restricted to the shape as shown in FIG. 1B and various shapes can be adopted so long as they can provide an improved hand-gripping area.

Further, it is also possible to, in place of the rubber member 1, provide a higher friction coefficient area at that place by painting or machine process than a remaining area.

Here, an explanation will be made below in more detail about a position where the rubber member 1 is provided.

Figure 2:
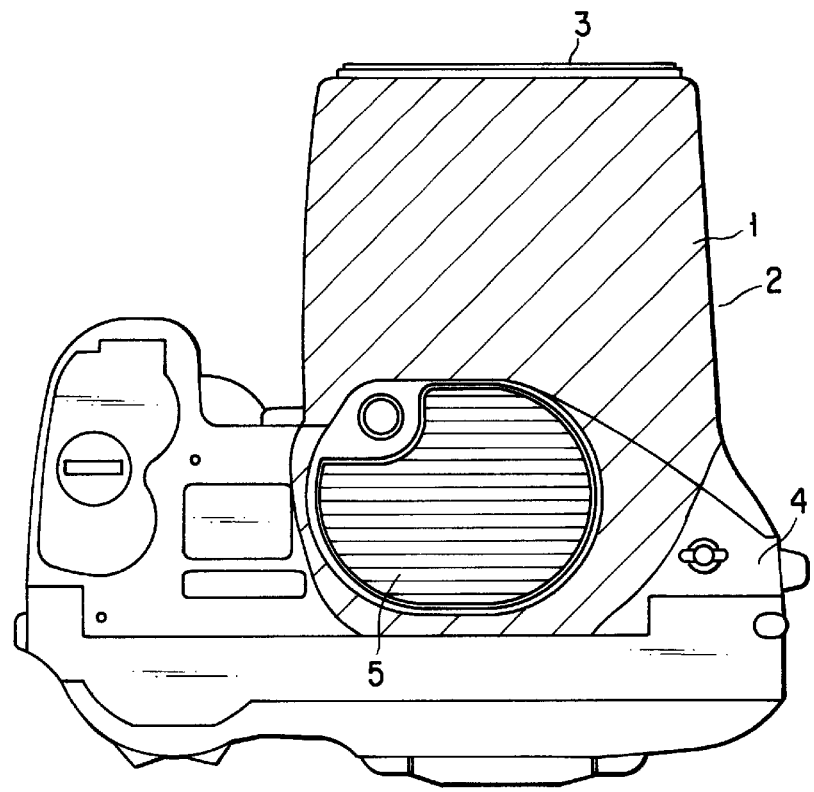
FIG. 2 is a bottom view showing the camera according to the embodiment of the present invention.

As shown at a bottom view of FIG. 2, the rubber member 1 is provided at a lower surface area including a center-of-gravity position of the outer covering member 2 by which the lens barrel section 3 and camera body section 4 are provided as the integral unit.

That is, the rubber member 1 is arranged at a substantially whole lower surface of the lens barrel section 3 and at a predetermined area on the camera body section 4 extending from the area of the lens barrel section 3. That is, the rubber member is arranged at a stable and effective area suggestible as such when the user grips the camera at his or her left hand.

Although, in this embodiment, the rubber member 1 is not provided on a tripod seat 5, that is, the tripod seat is exposed from a standpoint of an operation, in particular, from a convenience in use at a time of using the tripod, it is needless to say that the rubber member 1 may be provided on the tripod seat 5.

Figure 3:
FIG. 3 is a view showing a state in which the camera of the embodiment is hand-gripped.

Here, the state in which the user hand-grips the camera is shown in FIG. 3.

Since the rubber member 1 is worked as set out above, the user can initially grasp how the camera be hand-gripped.

That is, by providing the rubber member 1 at a predetermined area on the lower portion of the camera, the user is initially given a suggestion of how the camera be grasped in an ergonomically stable way without any "camera shaking". In addition, the presence of the rubber member ensures a readier left-hand grip on the camera and keeps the camera stabler.

Although the embodiment of the present invention has been explained, the present invention is not restricted thereto and, needless to say, various changes or modifications of the present invention can be made. Although, in the above-mentioned embodiment, the rubber member is provided at the predetermined area on the camera so as to suggest the readier and proper hand-grip position, it may be possible to, in place of the rubber member, apply painting, sand-flashing, etc., to a surface of the corresponding area to provide a higher coefficient of friction than the remaining section of the camera. This can provide the same effect as that obtained by providing the rubber member.

According to the present invention, as set out above, the user is initially given a suggestion of how the camera be hand-gripped properly and stably. By doing so, it is possible to provide a camera which can effectively prevent camera shaking beforehand.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   a picture-taking optical system for forming a subject image;
   a camera body section connected to the picture-taking optical system;
   an outer covering member for covering the picture taking optical system; and
   a grip section situated at a lower portion of the outer covering member extending from the picture-taking optical system to the camera body section and having a higher coefficient of friction than the remaining surface of the outer covering member.

2. A camera according to claim 1, wherein the grip section is comprised of a rubber member having an uneven or ragged surface.

3. A camera according to claim 1, wherein the grip section comprises a layer of paint.

4. A camera comprising:
   a picture-taking optical section for forming a subject image;
   a camera body connected to the picture-taking optical system;
   an outer covering member for covering the picture-taking optical section and the camera body; and
   a grip section for a left hand of a user situated on a lower surface, extending from the picture-taking optical section to the camera body of the outer covering member, wherein the grip section for a left hand of a user is obtained by a surface treatment process different from that used for the remaining surface of the outer covering member, whereby a grip position is visually recognizable.

5. A camera according to claim 4, wherein the grip section for a left hand has a higher coefficient of friction than the remaining surface of the outer covering member.

6. A camera according to claim 4, wherein the grip section for a left hand comprises a rubber member having an uneven or rough surface.

7. A camera according to claim 4, wherein the grip section for a left hand comprises a layer of paint.

8. A camera comprising:
   a picture-taking optical section for forming a subject image;
   a camera body connected to the picture-taking optical section;
   an outer covering member for covering the picture-taking optical section and the camera body; and
   a grip section formed on a lower surface, extending from the picture-taking optical section to the camera body of the outer covering member, wherein a grip position is recognizable by hand touching owing to a surface of the grip section being different from the remaining surface of the outer covering member.

9. A camera according to claim 8, wherein the grip section has a higher coefficient of friction than the remaining surface of the outer covering member.

10. A camera according to claim 8, wherein the grip section comprises a rubber member having an uneven or rough surface.

11. A camera according to claim 8, wherein the grip section comprises a layer of paint.

* * * * *